Oct. 15, 1968

H. W. RAHN 3,406,012

PROCESS FOR CLASSIFYING PIGMENTARY METAL OXIDE

Filed June 16, 1965

INVENTOR

HENRY W. RAHN

BY Chisholm and Spencer

ATTORNEYS

Oct. 15, 1968  H. W. RAHN  3,406,012
PROCESS FOR CLASSIFYING PIGMENTARY METAL OXIDE
Filed June 16, 1965  2 Sheets-Sheet 2

INVENTOR
HENRY W. RAHN
BY
ATTORNEYS

United States Patent Office 3,406,012
Patented Oct. 15, 1968

3,406,012
PROCESS FOR CLASSIFYING PIGMENTARY
METAL OXIDE
Henry W. Rahn, Pittsburgh, Pa., assignor to Pittsburgh
Plate Glass Company, Pittsburgh, Pa., a corporation of
Pennsylvania
Filed June 16, 1965, Ser. No. 464,470
4 Claims. (Cl. 23—202)

ABSTRACT OF THE DISCLOSURE

The production of pigmentary metal oxides, e.g., titanium dioxide, by vapor phase oxidation of metal halides, e.g., titanium tetrahalide, is described. The adverse effect of the presence of coarse, non-pigmentary metal oxide in the product is discussed and a process suggested for separating such non-pigmentary metal oxide.

This invention relates to the production of metal oxides, particularly pigmentary white metal oxides. More specifically, this invention involves the production of metal oxides, notably finely-divided rutile titanium dioxide, by the vapor phase oxidation of at least one metal halide.

In the production of metal oxide by the vapor phase oxidation of one or more metal halides (either in the presence of or absence of a fluidized bed), a metal halide is reacted in the vapor phase state with an oxygenating agent, e.g., oxygen, air, $H_2O_2$, oxides of phosphorous, oxides of nitrogen such as NO or $NO_2$, or mixtures of same, in a relatively confined area or reaction chamber maintained at the temperature of reaction of the halide and the oxygenating agent. Where the reactants are, for example, titanium tetrachloride and oxygen, the temperature of reaction is above 800° C., preferably 1000° C. to 1400° C.

An effluent stream containing hot product gases and metal oxide is withdrawn from the reaction zone and is preferably merged with an auxiliary gas stream.

The auxiliary gas may serve to maintain the mass velocity of the effluent stream or may be used to quench and cool the effluent as disclosed in U.S. Letters Patent 2,909,409.

In the production of pigmentary rutile titanium oxide by the vapor phase oxidation of titanium tetrachloride, the effluent product stream exiting from the reaction zone comprises hot gases carrying entrained oxide particles.

The hot gases consist essentially of titanium tetrachloride, oxygenating gas, and possibly other gases, e.g., gases such as carbon dioxide, chlorine, argon, nitrogen, helium, krypton, xenon, or mixtures of same, particularly where a process is practiced as taught by U.S. Letters Patents 3,069,281 or 3,068,113. Likewise, the effluent stream may contain hydrogen, carbon monoxide, carbon dioxide, sulfur-containing fuels is being employed as a means of supplying heat to the reaction zone.

The entrained oxide particles consist of 95 to 99.9 percent by weight pigmentary $TiO_2$ having a mean particle size of 0.15 to 0.50 micron, usually 0.20 to 0.30 micron, and 0.1 to 5.0 percent by weight non-pigmentary titanium oxide having a mean particle size of at least 1.0 micron, usually about 3.0 micron. Some of the larger particles may range from 10 to 100 microns.

The presence of such coarse non-pigmentary $TiO_2$ in the effluent stream prevents adequate processing of the pigmentary $TiO_2$, e.g., wet coating, and decreases the average over-all optical properties of the $TiO_2$ pigment, e.g., tinting strength and oil absorption.

It has been discovered that non-pigmentary metal oxide particles of grit, particularly $TiO_2$ particles, having a diameter of at least 1.0 micron, usually 3.0 microns and larger, can be selectively and preferentially precipitated, settled, and collected from the effluent stream.

In accordance with the invention, a reduction in velocity is effected in the effluent stream to a degree sufficient to selectively precipitate out the non-pigmentary metal oxide grit having a mean statistical diameter of at least 10.0 microns, usually 20 microns or larger, the reduction in velocity or deacceleration being insufficient to precipitate the pigmentary metal oxide having a mean diameter of less than 0.5 micron.

In one embodiment of the invention, negative acceleration is imparted to the effluent stream by sufficiently increasing the cross-sectional area of the stream (as measured perpendicular to the direction of stream flow) such that the stream velocity is decreased, the extent of the decrease being characterized in accordance with the formula:

$$\Delta u = \frac{-4V}{\pi}\left[\frac{D_1^2 - D_0^2}{D_0^2 D_1^2}\right]$$

wherein $\Delta u$ = change in velocity;
$V$ = the flow rate of the effluent in cubic distance units per time;
$D_0$ = initial mean diameter of the effluent stream measured perpendicular to the direction of flow;
$D_1$ = increased mean diameter of the effluent stream measured perpendicular to the direction of flow;

and wherein $D_1$ is at least 3 times $D_0$ such that $$\Delta u \leqq -\frac{32V}{9\pi D_0^2} \leqq -\frac{1.13V}{D_0^2}$$

Since acceleration is defined as the change in velocity per unit time, it may be readily determined once $\Delta u$ is known.

Reference is made to the accompanying drawings and the figures thereon which form a part of this specification.

Figure 1:
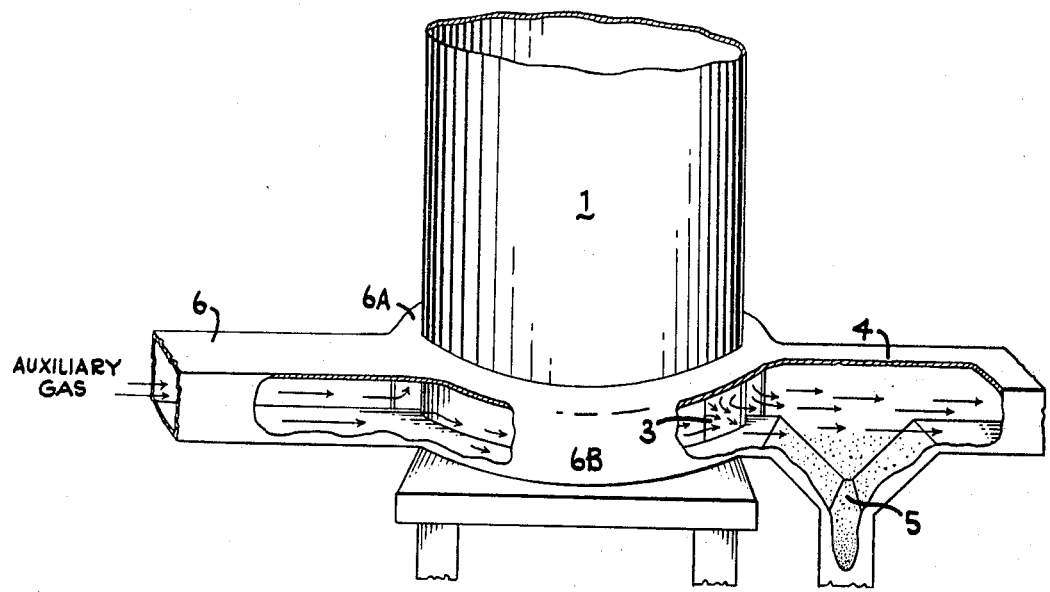
FIGURE 1 represents a three-dimensional view of one preferred embodiment of the present invention.
Figure 2:
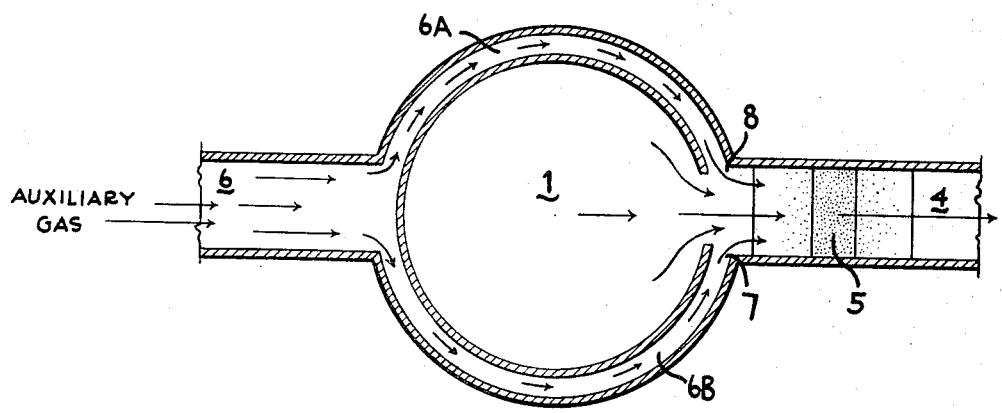
FIGURE 2 represents a cross section through FIGURE 1.

More particularly, there is shown in FIGURE 1 an elongated cylindrical vapor phase oxidation reactor chamber 1 into which reactants are preferably introduced at the top portion of the reaction (not shown), preferably by means of a series of concentric tubes such as disclosed in U.S. Letters Patent 3,214,284.

At the bottom of the reactor there is provided an opening 3 through which the effluent product stream exits from the reactor into conduit 4. A hopper 5 is shown externally of the reactor 1 for the collection of non-pigmentary metal oxide particles which precipitate from the effluent stream due to the momentary expansion and deacceleration of the effluent.

Also external of reactor 1 there is provided auxiliary gas conduit 6 which divides into conduits 6A and 6B, each of which encompasses the outside perimeter or circumference of the reactor 1 thereby providing preliminary indirect cooling of the effluent gas stream through the walls of the reactor.

Conduit 6A connects into conduit 4 at opening 8 and conduit 6B connects conduit 4 at opening 7.

Thus an auxiliary gas stream supplied through conduit 6 splits into two streams which flow separately through 6A and 6B and exit into conduit 4 through respective openings 7 and 8 thereby contacting and cooling the effluent stream being emitted from the reactor 1 through exit 3. The auxiliary gas also ensures that the effluent stream will have sufficient momentum and mass velocity to pass through subsequent process equipment (not shown), for example, cooling equipment and gas filters positioned downstream of the hopper 5.

Figure 3:
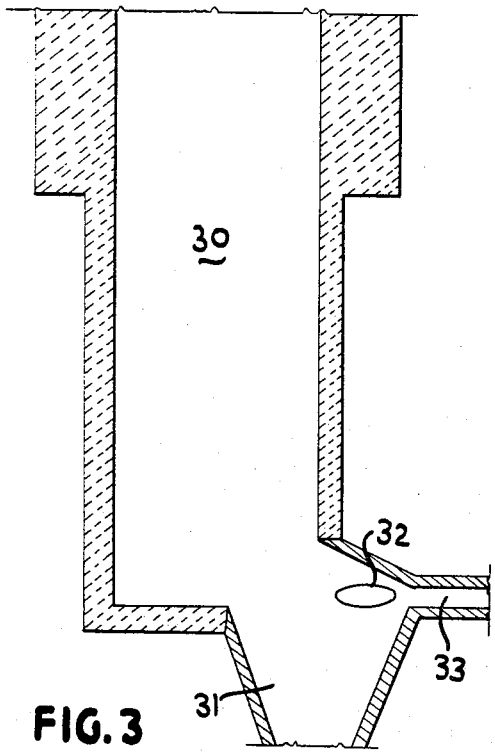
FIGURE 3 represents a cross-sectional side view of another embodiment.

In FIGURE 3 there is shown in cross-section a reactor 30 with a hopper 31 provided at the bottom for expanding and deaccelerating the effluent and precipitating non-pigmentary metal oxide. In the upper portion of the hopper there is provided a tangential port 32 through which auxiliary gas is supplied in a direction away from the reactor exit toward conduit 33. Likewise, there may be provided another tangential port opposite to 32.

Figure 4:
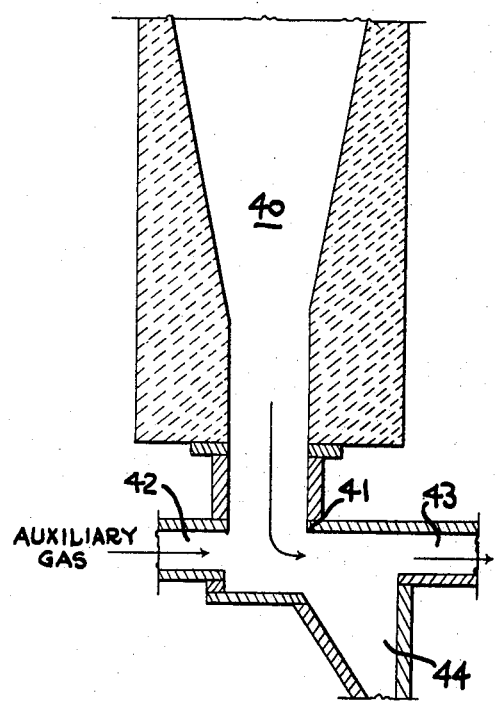
FIGURE 4 represents a cross-sectional side view of still another embodiment.

In FIGURE 4 there is shown in cross-section a reactor 40 from which the effluent stream exits at 41 and is contacted by an auxiliary gas emitted from conduit 42, the merged streams continuing their combined path of flow through the upper portion of hopper 44 to conduit 43.

The ratio of the mass velocity of the auxiliary stream to the mass velocity of the effluent product stream may range from 0.2 to 12.0. The velocity and mass velocity of each stream is calculated from the cross-sectional area of the conduit which is common to both streams, i.e., conduits 4, 33, or 43. The combined stream of recycle plus effluent product should have a linear velocity of at least 15 feet per second, preferably, from 35 to 75 feet per second.

Since the auxiliary stream is preferably a recycle stream, it should be approximately the same composition as that of the effluent gas having the same average molecular weight which would range from 55.0 to 75.0, preferably 62 to 68.

Both the auxiliary stream and effluent stream should be at an initial pressure of 1 to 20 atmospheres, preferably 1.1 to 1.3.

Although FIGURES 1 to 4 show the introduction of the auxiliary stream near reactor exit, the auxiliary stream may be added internally of the reactor. Likewise, the process may be operated without an auxiliary stream.

Figure 5:
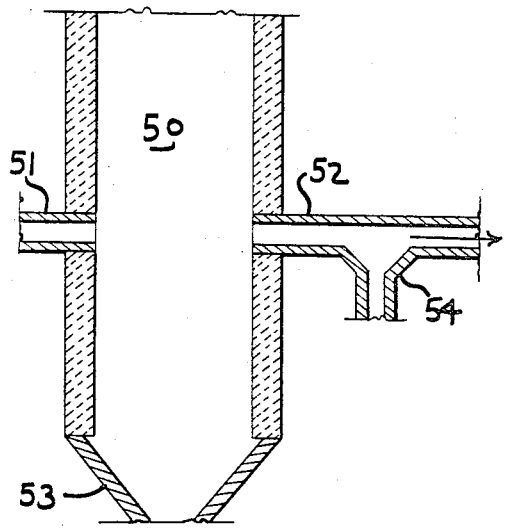
FIGURES 5 and 6 represent still further embodiments.

In FIGURE 5 there is shown a reactor 50 into which auxiliary gas is flowed through conduit 51. The effluent is withdrawn through conduit 52, the non-pigmentary metal oxide being precipitated and collected in hopper 54. At the bottom of the reactor 50 there is provided a hopper 53 for collecting non-pigmentary metal oxide not entrained in the effluent.

Figure 6:
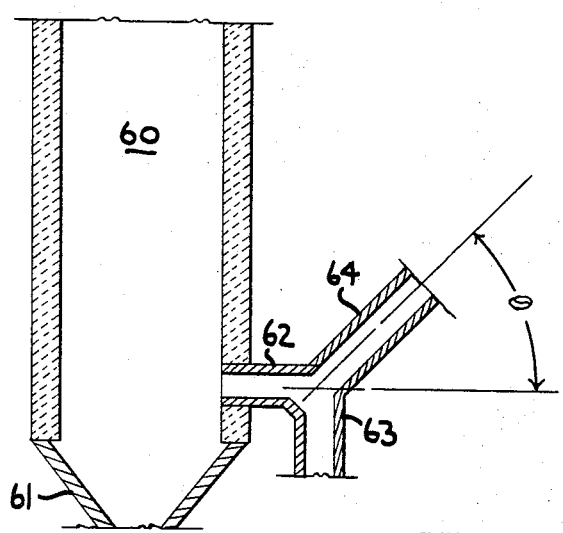

In FIGURE 6 there is illustrated reactor 60 with a hopper 61 at the bottom. The effluent exits via conduit 62, expands in hopper 63, and is flowed in an upward direction via conduit 64 having an angle theta ($\theta$) with respect to the horizontal. Angle theta ranges from 4 to 90 degrees When an auxiliary gas is employed, additional oxygenation gas, e.g., oxygen, may be added to the auxiliary gas in order to oxidize unreacted metal halide exiting from the reactor. Where $TiCl_4$ is being oxidized to form pigmentary $TiO_2$, the unreacted $TiCl_4$ in the effluent product stream may range from 0.1 to 20 percent based on the original moles of $TiCl_4$ introduced into the reactor.

Likewise, the auxiliary gases may contain various constituents for the coating of the pigment in the vapor phase. Ordinarily, the pigment is collected from the effluent stream, slurried, and wet treated as disclosed in copending U.S. application Ser. No. 121,327, filed July 3, 1961, by Dr. Hartien S. Ritter, now U.S. Letters Patent 3,146,-119.

However, in the practice of this invention, the pigmentary metal oxide may be coated and treated in the vapor phase by introducing liquid or vaporous metal halides, particularly those which can be oxidized to white metal oxides, into the effluent product stream. Such halides may comprise all or a portion of the auxiliary stream or may be merged downstream of the auxiliary stream after the quenching of the product.

Furthermore, the metal halides may be introduced with excess oxygenating gas, e.g., oxygen and/or steam. Typical metal halides are aluminum trichloride, silicon tetrachloride and titanium tetrachloride.

The following are typical examples.

Example I

The proces of FIGURE 3 is employed. Thirty-two (32) gram-moles per minute of $TiCl_4$ preheated to 500° C. is introduced into the upper portion of reactor 30. Vaporous aluminum trichloride at 300° C. is introduced into the $TiCl_4$ stream at 60 to 130 grams per minute before the $TiCl_4$ is introduced into the reactor 30. Liquid $TiCl_4$ is also added to the $TiCl_4$ at the rate of 0.18 gram-moles per minute before the $Ticl_4$ is introduced into reactor 30.

Heat is supplied to the reactor by the combustion of 17.4 gram-moles per minute of carbon monoxide and 48.4 gram-moles per minute of oxygen in a zone separate from the reactor. The products of combustion and the exothermic heat evolved are then introduced into reactor 30. Simultaneously, 5.7 gram-moles per minute of chlorine is flowed into the reactor 30.

All of the stream are introduced through concentric tubes as disclosed in U.S. Letters Patent 3,214,284 such that the chlorine stream serves as a shroud or layer between the $TiCl_4$ and combustion streams.

One hundred twenty-six and five-tenths (126.5) gram-moles per minute of effluent gaseous product at 1500° F. is withdrawn from the reactor 30. The effluent consists essentially of 31.7 gram-moles per minute of metal oxide, 0.3 gram-moles per minute of vaporous $TiCl_4$, 69.1 gram-moles per minute of oxygen, and 17.4 gram-moles per minute of $CO_2$.

The effluent is expanded into hopper 31 such that 1.2 gram-moles per minute of non-pigmentary metal oxide is collected. The non-pigmentary metal oxide has an analysis of 96.5 percent by weight titanium oxide, 3.1 percent by weight $Al_2O_3$, and 0.4 percent by weight $SiO_2$ basis the total weight of the metal oxide.

The non-pigmentary metal oxide has a tinting strength below 1200 with an average particle size in excess of 1.0 micron. Tinting strength is determined in accordance with the Reynold's Blue Method, A.S.T.M. D-332-26, "1949 Book of A.S.T.M. Standards," Part 4, p. 31, published by the American Society for Testing Material, Philadelphia, Pa.

A recycle gas stream at 142° F. is merged with the effluent, the recycle being red in a split stream flowed tangentially from two 3-inch Schedule 40 pipes 32. The recycle stream consists essentially of 0.74 gram-moles per minute of $TiCl_4$, 160.07 gram-moles per minute of chlorine, 40.22 gram-moles per minute of $CO_2$, and 18.63 gram-moles per minute of oxygen, a total of 219.7 gram-moles per minute.

The effluent and recycle streams are completely merged in conduit 33. Pigmentary metal oxide is subsequently recovered consisting essentially of 99.5 percent rutile $TiO_2$ and containing 0.43 percent by weight $SiO_2$ and 1.69 percent by weight $Al_2O_3$, basis the weight of the $TiO_2$. The pigment has a tinting strength of 1720 (Reynold's Scale) with an average particle size diameter of 0.25 micron.

Example II

The conditions of Example I are repeated except that hopper 31 is removed such that the effluent stream does not momentarily expand and the non-pigmentary metal oxide is not precipitated.

After about 2 hours, conduit 33 is plugged with metal oxide. The metal oxide product recovered during the 2 hours has an average tinting strength (Reynold's Scale) of 1450.

Although this invention has been described with particular reference ot titanium tetrahalide, e.g., $TiCl_4$, $TiBr_4$ and $TiI_4$, it may be used in the vapor phase oxidation of other metal halides.

The term "metal" as employed herein is defined as including those elements exhibiting metal-like properties, including the metalloids. Examples, not by way of limitation but by the way of illustration, of pigmentary metal oxides which may be produced by the aforementioned process are the oxides of aluminum, arsenic, beryllium, boron, gadolinium, germanium, hafnium, lanthanum, iron, phosphorous, samarium, scandium, silicon, strontium, tantalum, tellurium, terbium, thorium, thulium, tin, titanium, yttrium, ytterbium, zinc, thorium, thulium, tin, gallium, antimony, lead and mercury.

Likewise, it is to be understood any of the above teachings may be employed in any vapor phase oxidation process for providing a pigmentary metal oxide either in the presence or absence of a fluidized bed.

Obviously, many modifications and variations of the present invention are possible in light of the above teachings.

The above description of the invention has been given for purposes of illustration and not limitation. Various changes and modifications which fall within the spirit of the invention and scope of the appended claims will become apparent to the skilled expert in the art. Thus, it will be understood that the invention is in no way to be limited except as set forth in the following claims.

I claim:

1. In a process for producing pigmentary titanium dioxide by vapor phase oxidation of titanium tetrahalide selected from the group consisting of titanium tetrachloride, titanium tetrabromide and titanium tetraiodide in a reaction chamber at temperatures above 800° C. wherein a gaseous effluent product stream comprising pigmentary titanium dioxide and coarse non-pigmentary titanium dioxide is removed from the reaction chamber, the improvement which comprises removing said effluent product stream from the reaction chamber, reducing the velocity of said effluent product stream and, as a result of said reduction, selectively precipitate from said stream coarse non-pigmentary titanium dioxide having a mean diameter of at least 10 microns.

2. The process of claim 1 wherein the coarse non-pigmentary titanium dioxide selectively precipitated from the effluent product stream has a mean diameter of at least 20 microns.

3. The process of claim 1 wherein the reduction in velocity is accomplished by increasing the cross-sectional area in which the effluent stream is flowing.

4. The process of claim 3 wherein the reduction in velocity is expressed by the formula:

$$\Delta u \leqq \frac{-1.13V}{D_0^2}$$

wherein $\Delta u$ is the change in velocity, V is the flow rate of the effluent product stream in cubic distance units per time, and $D_0$ is the initial mean diameter of the effluent stream measured perpendicular to the direction of flow.

References Cited

UNITED STATES PATENTS

| | | | |
|---|---|---|---|
| 2,394,633 | 2/1946 | Pechukas et al. | 23—202 |
| 3,022,137 | 2/1962 | Nelson | 106—300 XR |
| 3,188,173 | 6/1965 | Hughes et al. | 23—202 XR |

FOREIGN PATENTS

| | | |
|---|---|---|
| 631,032 | 11/1961 | Canada. |
| 907,211 | 10/1962 | Great Britain. |

OSCAR R. VERTIZ, Primary Examiner.

EDWARD STERN, Assistant Examiner.